(12) United States Patent
Linke et al.

(10) Patent No.: US 8,512,031 B2
(45) Date of Patent: Aug. 20, 2013

(54) DEVICE FOR BLOW-MOLDING CONTAINERS

(75) Inventors: Michael Linke, Hamburg (DE); Michael Litzenberg, Geesthacht (DE); Rolf Baumgarte, Ahrensburg (DE); Frank Lewin, Tangstedt (DE); Matthias Grunwald, Dortmund (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 51 days.

(21) Appl. No.: 12/991,873

(22) PCT Filed: Mar. 31, 2009

(86) PCT No.: PCT/DE2009/000475
§ 371 (c)(1),
(2), (4) Date: Mar. 23, 2011

(87) PCT Pub. No.: WO2009/135453
PCT Pub. Date: Nov. 12, 2009

(65) Prior Publication Data
US 2011/0177193 A1    Jul. 21, 2011

(30) Foreign Application Priority Data
May 9, 2008    (DE) .......................... 10 2008 023 701

(51) Int. Cl.
*B29C 49/42* (2006.01)
*B29C 49/68* (2006.01)
(52) U.S. Cl.
USPC ...................... 425/534; 198/803.12; 279/2.23

(58) Field of Classification Search
USPC ..... 425/534; 294/93; 279/2.23; 198/803.12
See application file for complete search history.

(56) References Cited

U.S. PATENT DOCUMENTS

| 3,118,683 | A | * | 1/1964 | Hoshizaki | 279/2.23 |
|---|---|---|---|---|---|
| 4,572,355 | A | * | 2/1986 | Hunter | 198/803.12 |
| 5,542,526 | A | * | 8/1996 | Wurgler | 198/803.12 |
| 5,660,902 | A | * | 8/1997 | Unterlander et al. | 428/35.7 |
| 6,106,273 | A | | 8/2000 | O'Dell | |
| 7,694,802 | B2 | * | 4/2010 | Lapert | 425/534 |
| 2006/0091620 | A1 | * | 5/2006 | Sakamaki et al. | 279/62 |
| 2008/0017779 | A1 | * | 1/2008 | Lapert | 248/560 |

FOREIGN PATENT DOCUMENTS

| DE | 2352926 | 4/1975 |
|---|---|---|
| DE | 4212583 | 10/1993 |
| DE | 4340291 | 6/1995 |
| DE | 19906438 | 8/2000 |
| DE | 102005011805 | 1/2007 |
| EP | 1880825 | 1/2008 |
| JP | 2005161576 | 6/2005 |
| WO | 02/38353 | 5/2002 |

* cited by examiner

*Primary Examiner* — Robert B Davis
(74) *Attorney, Agent, or Firm* — Lucas & Mercanti, LLP; Klaus P. Stoffel

(57) ABSTRACT

The device serves for blow molding containers. Preforms of a thermoplastic material are heated in the area of a heating section and are subsequently transferred to a blow device. The blow device is provided with at least one blow station for deforming the preforms into the containers. The preforms are held along at least a portion of their transport path by a support element which over at least portions is loosely inserted into an opening section of the preform and is tensioned after the insertion within the opening section. Along an outer circumference of the head are arranged at least two clamping elements at a distance relative to each other.

20 Claims, 7 Drawing Sheets

DEVICE FOR BLOW-MOLDING CONTAINERS

BACKGROUND OF THE INVENTION

The invention relates to a device for blow molding containers which includes a heating section for heating preforms of a thermoplastic material and which is provided with a blow device which includes at least one blow station for deforming the preforms into the containers, wherein a support element for transporting the preforms has at least one positionable clamping element in the area of a head which is insertable into the receiving opening of the preform.

When the deformation of the containers takes place under the influence of blow pressure, preforms of a thermoplastic material, for example, of PET (Polyethylene Terephtalate), are supplied within a blow machine to different processing stations. Typically, such a blow machine has a heating device as well as a blow device in whose areas the previously heated preform is expanded by biaxial orientation into a container. The expansion takes place by means of compressed air which is conducted into the preform to be expanded. The technical sequence of such an expansion of the preform is explained in DE-OS 43 40 291. The introduction of the pressurized gas mentioned above also includes the introduction of compressed gas into the container bladder which is developing in this area as well as the compressed gas introduction into the preform at the beginning of the blow procedure.

The fundamental construction of a blow station for deforming containers is described in DE-OS 42 12 583. Possibilities for addressing the temperature of the preforms are explained in DE-OS-23 52 926.

Within the device for blow moulding, the preforms as well as the expanded containers can be transported by means of different manipulating devices. The use of transport mandrels, which are placed on the preforms, is known in the art. However, the preforms can also be manipulated with other support devices. The use of gripping tongs for manipulating preforms and the use of clamping mandrels, which for support can be inserted into an opening area of the preform, are also among the available constructions.

A manipulation of containers and preforms with the use of transfer wheels is described, for example, in DE-OS 199 06 438 in an arrangement for a transmitting wheel between a blow-wheel and an output section and another transfer wheel between the heating section and the blow-wheel.

The manipulation of the preforms already described above takes place, on the one hand, in accordance with the so called two stage process in which the preforms are initially manufactured in accordance with an injection molding process, are subsequently subjected to intermediate storage and are only later blown up in a container after the temperature thereof has been conditioned. On the other hand, a use in accordance with the so called single process takes place in which the preforms, immediately after being manufactured in accordance with injection molding technology and sufficiently hardened, are adjusted in their temperature and are subsequently blown up.

With respect to blow stations used, different embodiments are known. In blow stations, which are arranged on rotating transport wheels, a book-like turning of the mold carriers is frequently found. However, it is also possible to use other mold carriers which are slidable relative to each other or are guided in some other manner. In stationary blow stations, which are particularly suitable for receiving several cavities for forming the containers, typically plates are used as mold carriers which are arranged parallel to each other.

The transport mandrels used for a transport of the preforms cannot yet meet all requirements which are made with respect to secure transport of the preforms with high transport velocities. In particular, the transport mandrels which are introduced into an opening area of the preforms still have number of deficiencies. The known clamping mandrels are as a rule constructed of a hard core on which is placed on the outer side thereof an O-ring of an Elastomer. When the clamping mandrel, is inserted into the opening area of the preform, the O-ring is elastically deformed and results in a fixing of the preform on the clamping mandrel.

Such a mounting of the preforms has been found unreliable in increasing durations of operation. On the one hand, the inner diameters of the preforms are subject to manufacturing tolerances which lead to different clamping forces. Moreover, the elasticity, and, thus, the resilient force of the elastomer material change with increasing age and in dependence on the respectively prevailing temperature. It is also not possible to apply an excess tension as a precaution on the opening area because such a large tension would lead to deformations of the opening area. Because of these properties of the elastomer materials, it must be expected that a more or less large number of the preforms drop from the clamping mandrels and are not available for a subsequent blowing deformation.

DE 10 2005 011 805 already describes a controllable clamping element which is composed of an elastomer material and is constructed as a spring-like hollow section. As compared to the use of solid sections, for example, in the form of O-rings, it is possible to already achieve significant improvements, however, with respect to the requirements for a uniform and reproducible production of clamping forces for a long operating time, they could still not be met in a satisfactory way.

SUMMARY OF THE INVENTION

The object of the present invention is to construct a device as described in the introduction above that supports a reliable transport of the preforms at high transport velocities.

In accordance with the invention, this object is met by constructing the clamping element as a rounded element and by arranging along the circumferential direction of the head at least two clamping elements at a distance from each other.

As a result of the loose insertion of the support element into the opening section of the preform, any frictional effects during the insertion which may lead to a material abrasion, are avoided. After reaching the final positioning of the support element within the opening section, an active clamping and accordingly a secure support of the preform takes place. After an intended positioning of the preform, the tension between the support element and the opening section is once again removed and the support element can be pulled out of the opening section without friction with the preform.

The rounded configuration of the clamping elements and the use of several separate clamping elements facilitates a defined radial positioning of the clamping elements, without requiring an elastic deformation. The clamping elements can be positioned exactly in a radial direction for carrying out the clamping process. As a result of providing a rounded contour, a simple sliding along the corresponding guiding surfaces is reinforced. Moreover, the clamping forces can be introduced locally within a narrow range of an inner limitation of the opening section of the preform.

A transport of the preforms without carrying out turning procedures is reinforced by transporting the preforms at least for a portion of their transport path from the support element in a vertical direction extending upwardly in accordance with the opening section.

In accordance with an embodiment variation, it is provided that the clamping between the support element and the preform is predetermined by a pulling force acting on the support element.

It is also intended that tensioning between the support element and the preform is predetermined by a compression force acting on the support element.

A reliable support of the preforms can be effected by holding the support element of the preform in a basic condition and to obtain a release of the preform only through an active adjusting force.

In accordance with other embodiment, it is also possible that fixing of the preform is generated by the support element through an active adjusting force.

A high reproduction accuracy is achieved by predetermining the support and release of the preform through a cam control which acts on the support element.

A typical use resides in transporting the preforms from the support element at least along a portion of a heating section.

Small mechanical loads with simultaneously high reliability can be achieved in that an adjusting force acting from the support element in a longitudinal direction of the support element is transformed into a transverse force, which compared to the adjusting force is greater and holds the preforms.

The compact and robust embodiment is made available by providing the support element with a sleeve-like basic element and a positioning element guided in the basic element and supporting the head.

A defined force transmission is reinforced by constructing the clamping elements to be rigid.

A secure manipulation of the preforms is achieved by arranging at least three tensioning elements along the circumference of the head.

For transforming a lifting movement into a radial positioning movement, it is proposed that the tensioning element is positionable along the guide surface arranged obliquely relative to the horizontal in a radial direction of the head.

A defined sequence of movements during the radial displacement of the clamping element is reinforced by arranging two guide elements obliquely relative to the horizontal and located opposite each other and at least over portions being spaced from each other.

In particular, a uniform sequence of movements is achieved by widening the two guide surfaces in a radial direction of the head outwardly in a V-shaped manner.

Alternating force application ranges within the range of the clamping element and, thus, a high service duration can be achieved by constructing the tensioning element spherically. In accordance with another embodiment, it is also provided that the tensioning element is constructed roll-like.

The clamping elements can be prevented from falling out of the head by constructing a receiving space for the clamping element in the area of the head in the manner of a housing.

A contribution for securing the clamping elements is particularly made in that the clamping element in the area of the head is guided by a guide surface inclined downward obliquely relative to the vertical direction and by a limiting surface inclined upwardly in the vertical direction.

BRIEF DESCRIPTION OF THE DRAWINGS

The drawings show embodiments of the invention schematically. They show.

DETAILED DESCRIPTION OF THE INVENTION

Figure 1:
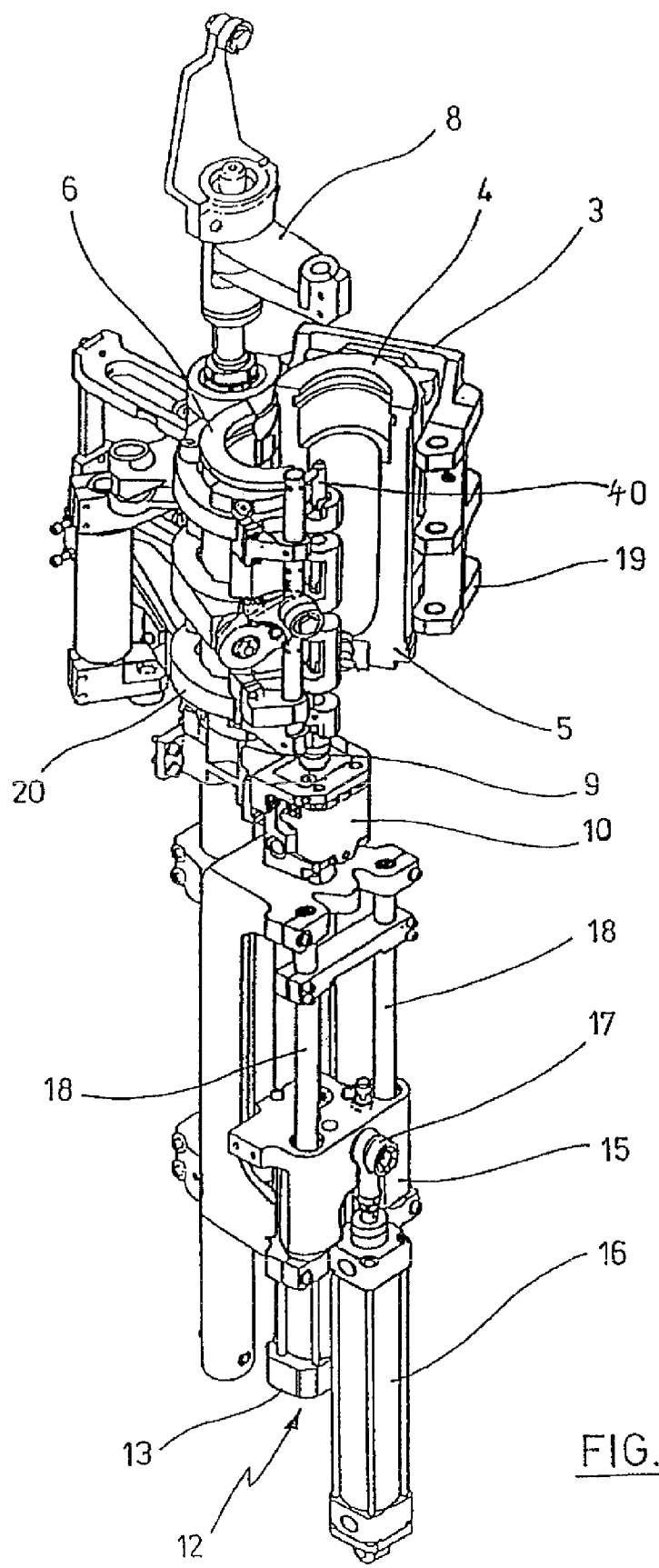
FIG. 1 a perspective view of a blow station for manufacturing containers from preforms.
Figure 2:
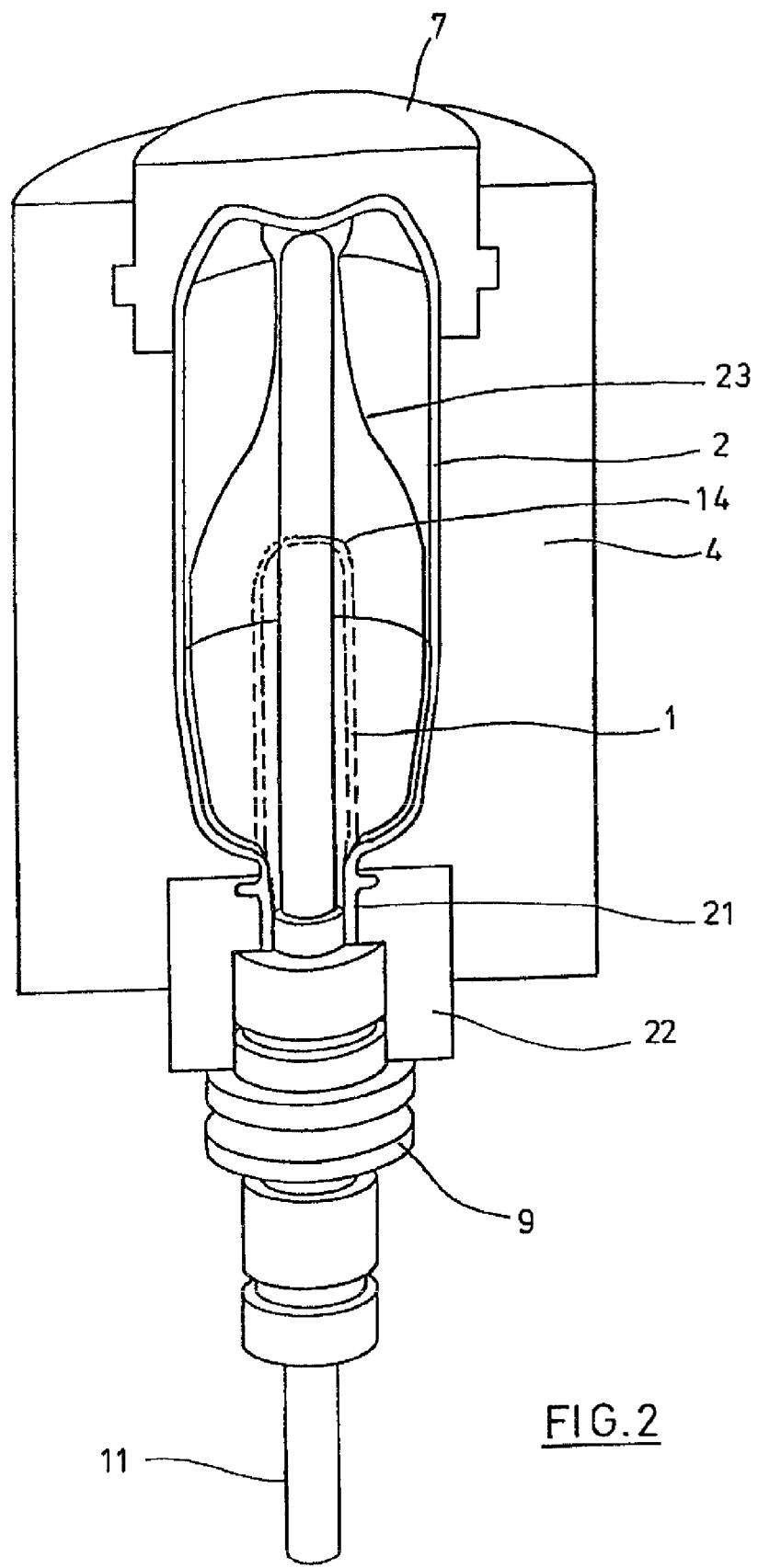
FIG. 2 a longitudinal sectional view through a blow mold in which a preform is stretched and expanded.

The principal configuration of a device for deforming preforms 1 into containers 2 is illustrated in FIG. 1 and in FIG. 2. The arrangement can be as illustrated or turned by 180 degrees in a vertical plane.

The device for forming the containers 2 is essentially composed of a blow station 3 which is provided with a blow mold 4 into which a preform 1 can be placed. The preform 1 may be an injection molded part of polyethylene terephthalate. For facilitating the use of the preforms 1 in the blow mold 4 and for facilitating a removal of the finished containers 2, the blow mold 4 consists of mold halves 5, 6 and a bottom part 7 which is positionable by a lifting device 8. The preform 1 can be fixed in the area of the blow station 3 by a holding element 9. It is possible, for example, to place the preform 1 by means of tongs or other manipulating means directly into the blow mold 4.

For facilitating a compressed air supply line, underneath the blow mold 4 is arranged a connecting piston 10 which supplies the preform 1 with compressed air and simultaneously carries out sealing. In accordance with a modified construction, it is basically also conceivable to use fixed compressed air supply lines.

Stretching of the preforms 1 takes place in this embodiment by means of a stretching rod 11 which is positioned by cylinder 12. In accordance with another embodiment, a mechanical positioning of the stretching rod 11 is carried out through cam segments which are acted upon by gripping rolls. The use of cam segments is particularly advantageous if a plurality of blow stations 3 are arranged on a rotating blow wheel 25.

In the embodiment illustrated in FIG. 1, the stretching system is constructed in such a way that a tandem arrangement of two cylinders 12 is made available. From a primary cylinder 13, the stretching rod 11 is initially moved up into the area of a bottom 14 of the preform 1 prior to the beginning of the actual stretching procedure. During the actual stretching procedure, the primary cylinder 13 is positioned with extended stretching rod jointly with a carriage 15 supporting the primary cylinder 13 by means of a secondary cylinder 16 or a cam control. In particular, it is intended to utilize the secondary cylinder 16 in such a way controlled by cams that, from a guide roll 17 which slides during the carrying out of the stretching procedure along a cam path wherein the cam path predetermines an actual stretching position. The guide roll 17 is pressed by the secondary cylinder 16 against the guide track. The carriage 15 slides along two guide elements 18.

After closing of the mold halves 5, 6 arranged in the area of supports 19, 20, a locking of the supports 19, 20 takes place relative to each other by means of a locking device 20.

For adapting the different shapes of an opening section 21 of the preform 1, it is provided in accordance with FIG. 2 to use separate threaded inserts 22 in the area of the blow mold 4.

FIG. 2 shows in addition to the blown containers 2, also in broken lines, the preform 1 and schematically a container bladder 23 which is developing.

Figure 3:
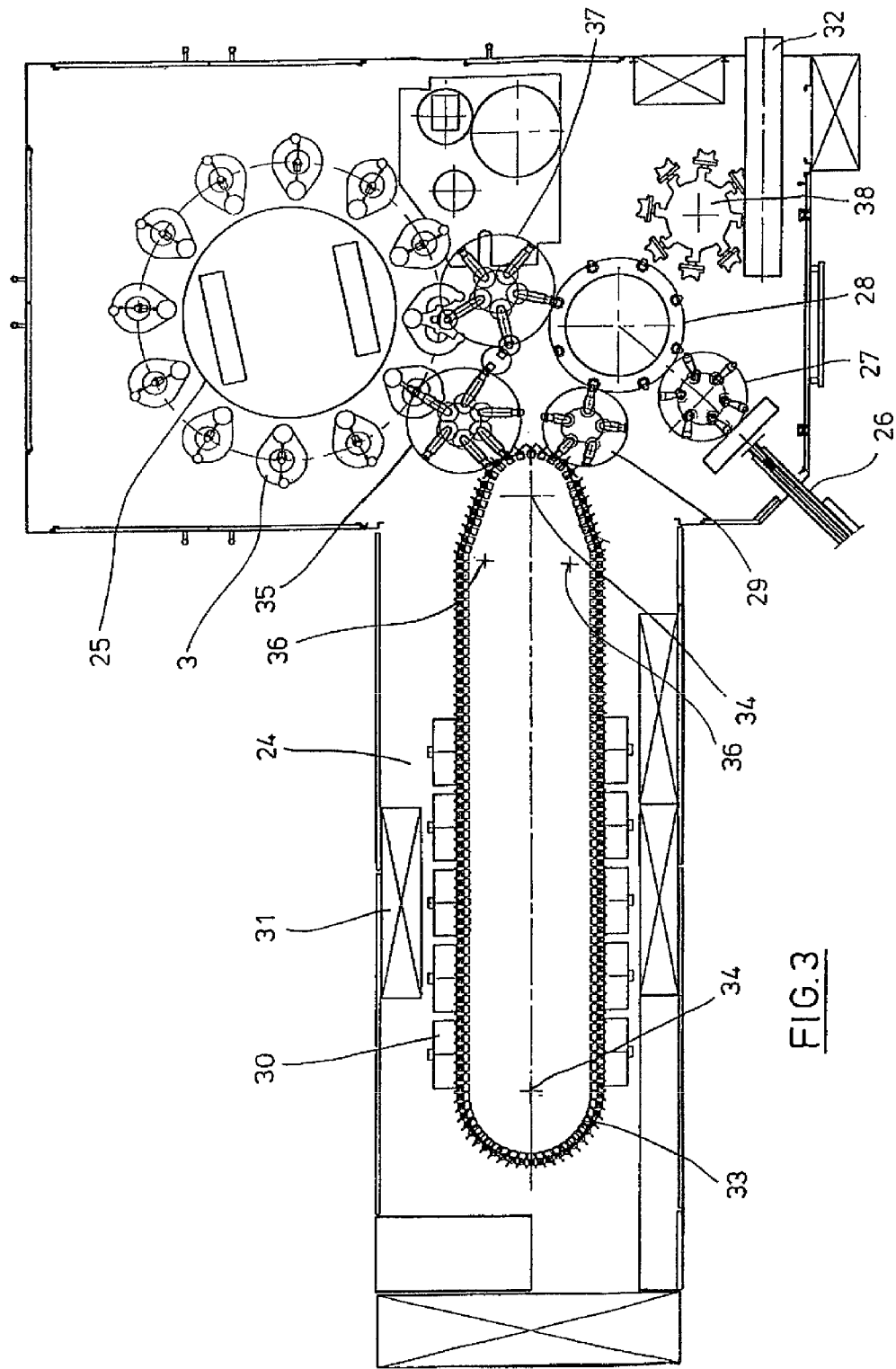
FIG. 3 is a sketch showing a basic construction of a device for blow molding of containers.

FIG. 3 shows the basic construction of a blow machine which is provided with a heating section 24 as well as a rotating blow wheel 25. Starting from a preform input 26, the preforms 1 are transported by transfer wheels 27, 28, 29 in the area of the heating section 24. Along the heating section 24 are arranged heating radiators 30 as well as blowers 31 in order to adjust the temperature of the preforms 1. After the temperature of the preforms 1 has been sufficiently adjusted, they are transferred by a transfer wheel 35 to the blow wheel 25 in whose area are arranged the blow stations 3. The finished blown containers 2 are supplied by additional transfer wheels 37, 28, 38 of an output section 32. The transfer wheel 37 is constructed as a removal wheel and the transfer wheel 39 is constructed as an output wheel.

In order to be able to deform a preform 1 into a container 2 in such a way that the container 2 has material properties which ensure a long usefulness of foodstuffs filled into the container 2, particularly of beverages, special process steps must be adhered to when heating and orienting the preforms 1. Moreover, advantageous effects can be achieved by maintaining dimensioning rules.

Different synthetic materials can be used as thermoplastic material. For example, PET, PEN or PP can be used.

The expansion of the preform 1 during the orienting procedure takes place by means of compressed air supply. The compressed air supply is divided into a preliminary blowing phase in which gas, for example, compressed air, is supplied at a low pressure level and into a subsequent principal blowing phase in which the gas is supplied at a higher pressure level. During the preliminary blowing phase, typically compressed air with a pressure in intervals of 10 bar to 25 bar is used, and during the principal blowing phase, compressed air with a pressure in intervals of 25 bar to 40 bar is supplied.

From FIG. 3 it can also be seen that in the illustrated embodiment the heating section 24 is constructed of a plurality of circulating transport elements 33 which are arranged in a row in the manner of a chain and are guided along by guide wheels 34, 36. In particular, it is intended that an essentially rectangular basic contour is stretched out because of the chain-like arrangement. In the illustrated embodiment, in particular in the area of the extension of the heating section 24 facing the transfer wheel 27, an individual guide wheel 34 having a relatively large dimension is used, and in the area of adjacent guides, two comparatively smaller guide wheels 36 are used. Basically, however, other guide means are conceivable.

For facilitating an arrangement of the transfer wheel 27 and the blow wheel 25 relative to each other which is as tight as possible, the illustrated arrangement has been found particularly advantageous because, in the area of the corresponding extension of the heating section 24, three guide wheels 34, 36 are positioned, nearly always the smaller guide wheels 36 in the area of the transfer to the linear extensions of the heating section 24 and the larger guide wheel 34 in the immediate transfer area for the transfer wheel 27 and the blow wheel 25. As an alternative to the chain-like elements 33, it is also possible, for example, to use a rotating heating wheel.

After a finished blowing of the containers 2, the containers are transported by the transfer wheel 38 from the area of the blow stations 3 and to the outlet section 32.

Figure 4:
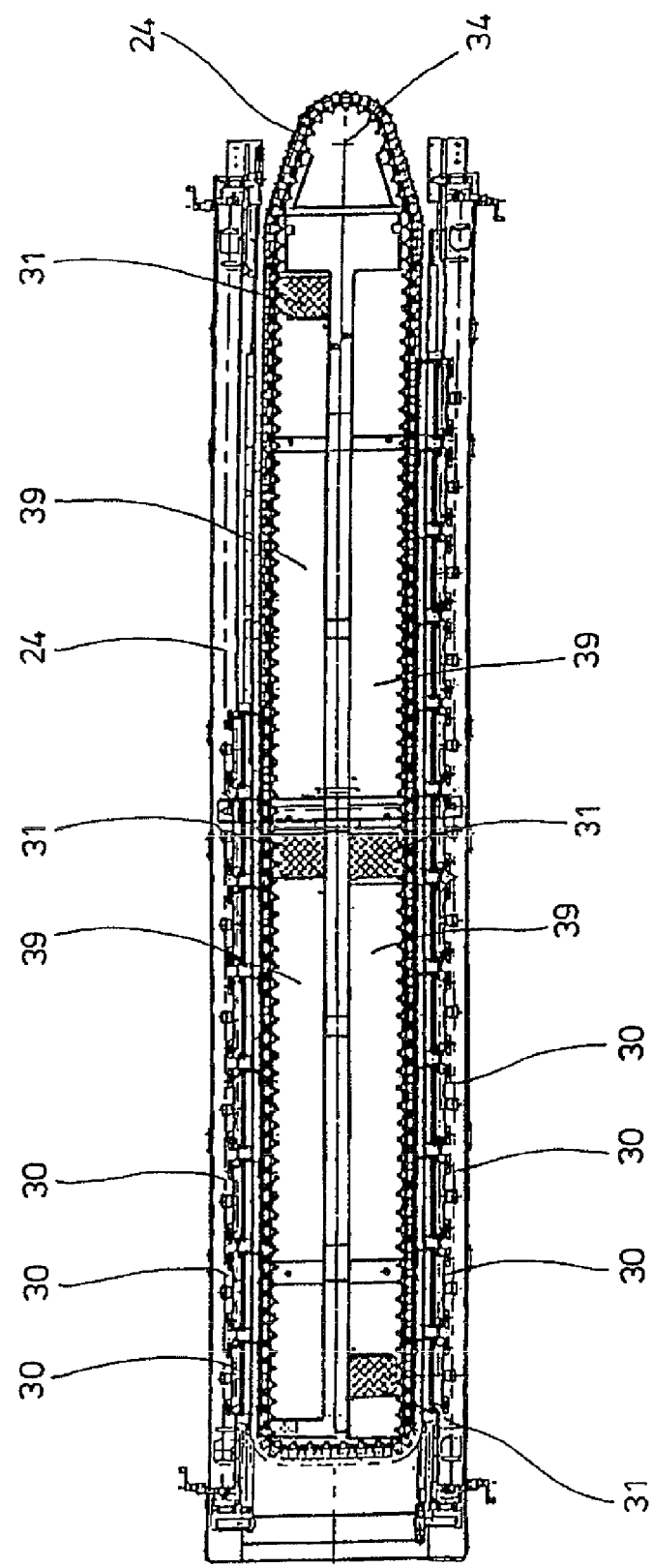
FIG. 4 is a modified heating section with enlarged heating capacity.

In the modified heating section 24 illustrated in FIG. 4, a greater quantity of preforms 1 can be heated per unit of time due to the larger number of heating radiators 30. The blowers 31 in this case conduct the cooling air into the area of cooling air ducts 39 which are located opposite the corresponding heating radiators 30 and discharge the cooling air through discharge openings. As a result of the arrangement of the discharge devices, a flow direction of the cooling air is realized essentially transversely of a transport direction of the preforms 1. The cooling air ducts 39 can in the area of surfaces located opposite the heating radiators 30 make available surfaces for heating radiation; also, it is possible to realize cooling of the heating radiators 30 by the discharged cooling air.

A transport of the preforms 1 and the containers 2 through the blow machine can take place in different ways. In accordance with another variation of an embodiment, the preforms are carried by transport mandrels along the essential portion of the transport path. However, it is also possible to carry out a transport of the preforms with the use of tongs which act from the outside at the preform, or inward mandrels which are inserted into an opening area of the preform. Also, with respect to the spatial orientation of the preform different variations are conceivable.

In accordance with a variation, the preform is supplied in the area of the preform input 26 with its opening directed upwardly in vertical direction, is subsequently turned, is conveyed along the heating section 24 and the blow wheel 25 with its opening oriented downwardly in the vertical direction, and is turned once again before reaching the discharge section 32. In accordance with another variation, the preform 2 is heated in the heating section 24 while being oriented with its opening downwardly in the vertical direction, but is turned again by 180 degrees prior to reaching the blow wheel 25.

In accordance with a third variation, the preform travels through the entire area of the blow machine without carrying out any turning procedures, with its opening being upwardly oriented in the vertical direction.

Figure 5:
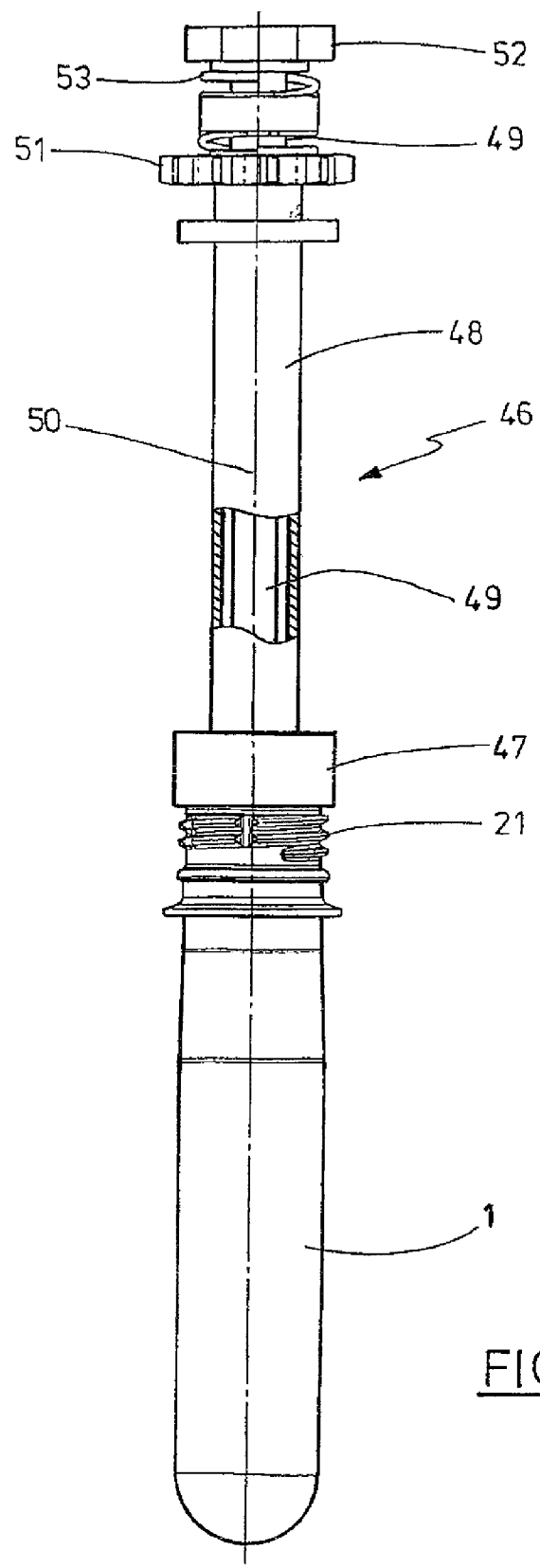
FIG. 5 is a side view of a preform into which an actively pretensionable support element is inserted.

FIG. 5 shows a side view of a preform 1 into whose opening section 21 is partially inserted a support element 46. The support element 46 has in the area of its end facing the preform 1 a contact pressure element 47 which is fastened to a sleeve-shaped basic element 48. Within the basic element 48, a positioning element 49 is guided which is moveable in the direction of a longitudinal axis 50 relative to the basic element 48. In the area of its extension facing away from the preform, the basic element 48 holds a closing element 51 that in the embodiment according to FIG. 5 is shaped in the form of a gear wheel. Opposite the closing element 51, a limiting element 52 of the positioning element 49 is supported by a spring 53. The spring 53 is constructed as a tension spring and facilitates a displacement of the positioning element 49 within the basic element 48 in the direction toward the preform 1. After the conclusion of a pulling force application of the positioning element 49, the latter is returned by the spring 53 into a basic position.

Figure 6:
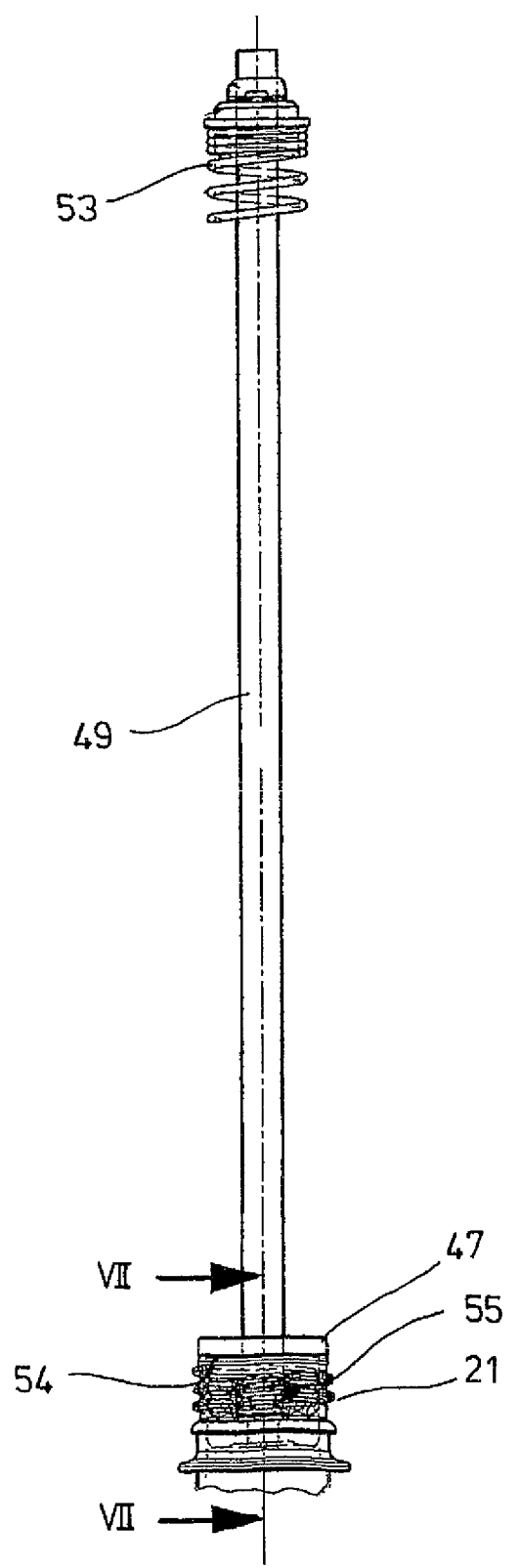
FIG. 6 is a partial illustration of the arrangement according to FIG. 5 with the tube-like basic elements being removed.

FIG. 6 shows a partial illustration of the arrangement according to FIG. 5 with the basic element 48 being removed. It can be seen that the opening section 21 is guided by an upper limitation 54 against the pressure element 47. The positioning element 49 engages with its head 55 in the opening section 21.

Figure 7:
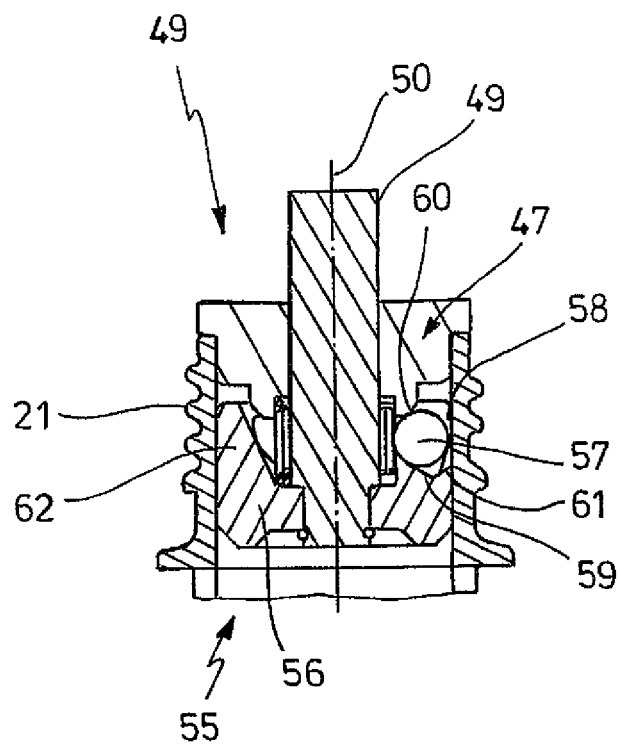
FIG. 7 is a partial illustration of a longitudinal sectional view of a preform with inserted support element in an untensioned position.

The head 55 is composed, as illustrated in FIG. 7, essentially of a tensioning element 56 and a clamping element 57 arranged between the tensioning element 56 and the pressure element 47. The clamping element 57 can be constructed as a ball.

In the inserting position illustrated in FIG. 7, the spring 53, which is not shown here, is essentially untensioned and a gap 58 extends between the clamping element 57 and an internal limitation of the opening section 21. The positioning element 49 is in this state insertable into the opening section 21 free of friction or at least low in friction. For carrying out a tensioning of the clamping element 57 relative to the preform 1, the positioning element 49 is partially pulled out of the basic element 48 in a direction facing away from the preform 1. The clamping element 57 is as a result displaced between the pressure element 47 and the tensioning element 56 by a radial movement component and is pushed in the direction of the inner wall of the preform 1 toward the outside. This results in a spreading of the head 55 and a corresponding fixing of the preform 1.

FIG. 7 shows that the clamping element 47 is guided between a guide surface 59 of the tensioning element 56 inclined relative to the horizontal and a guide surface 60 of the contact pressure element 47 which is also inclined relative to the horizontal. The guide surface 59 has a downward inclination relative to the horizontal and the guide surface 60 has an upward inclination. Starting from the longitudinal axis 50, the guide surfaces 59, 60 define a receiving space which is partially provided with a V-shaped cross sectional surface. In an area of the guide surface 59 facing away from the longitudinal axis 50, the guide surface 59 extends into a limiting surface 61 which has an upward inclination relative to the horizontal. The guide surface 59 and the limiting surface 61 define a receiving space for the clamping element 57 which in this area also has a V-shaped cross sectional surface. The limiting surface 61 prevents the clamping element 57 from dropping when the head 55 is pulled out of the opening section 21. For supporting a defined arrangement of the plurality of the clamping element 57 in a circumferential area of the head 57, the tensioning element 56 has separating webs 62 which extend each between two adjacent clamping elements 57. For example, it is possible to provide the tensioning element 56 with six separating webs 62 and make available receiving chambers for six clamping elements 57 as a result.

Figure 8:
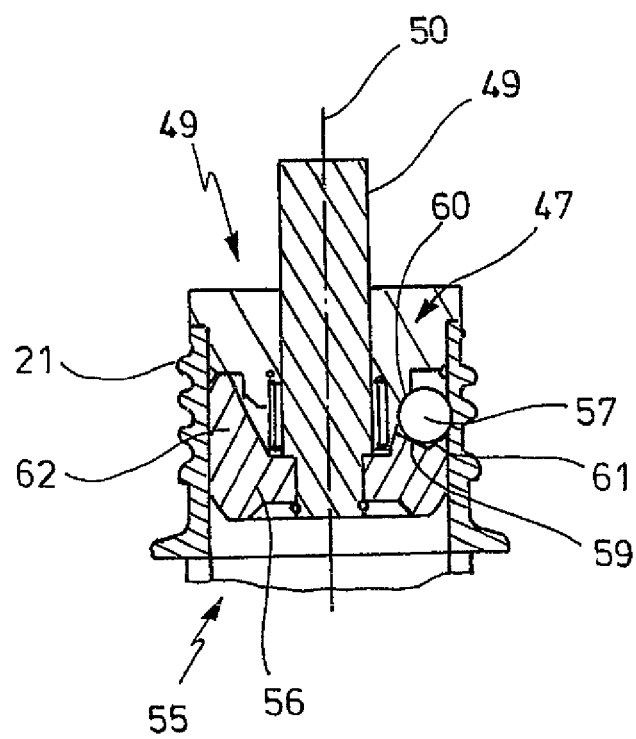
FIG. 8 is the arrangement according to FIG. 7 in a tensioning position with radially outwardly displaced balls.

FIG. 8 shows the arrangement according to FIG. 7 after a positioning of the tensioning element 56 in the direction toward the contact pressure element 47. A maximum positioning of the tensioning element 56 in the direction toward the contact pressure element 47 is in this case fixed by a contact of the separating webs 62 at the contact pressure element 57. By the approach of the guide surfaces 59, 60 toward each other, the clamping elements 57 are positioned in a radial direction outwardly and thereby fix the preform 1. In accordance with a preferred embodiment, the clamping elements 57 are constructed as balls. However, it is also conceivable to utilize, for example, a cylindrical or sleeve-like contour. A preferred material for the clamping element 57 is ceramic material. This makes it possible to reduce a heat transfer between the clamping elements 57 and the preform 1. However, it is basically possible to use other materials, for example, metal.

The rounded contour of the clamping element 57 results in a comparatively low contact area between the clamping element 57 and the preform 1, so that a high surface pressure can be achieved with a predetermined pressing force.

A transport of the support element 46 along a portion of the blow machine, particularly along the heating section 24, can be carried out, for example, with the use of guide rails which act between the closing element 51 and a transverse web.

When using the closing element 51 provided with the toothing, a rotational movement of the support element 46 around the longitudinal axis 50 can be caused.

For carrying out a positioning movement of the positioning element 49 relative to the basic element 48, a cam control can be used. The cam control can be pulled, for example, against the force of the spring 53 out of the basic element 48, so that the support element 46 returns after a release by the cam control back into the basic position illustrated in FIG. 7.

In accordance with another embodiment, it is also possible to construct the spring 53 as a compression spring which in a basic positioning displaces the clamping element 57 between the tensioning element 56 and the contact pressure element 47 toward the outside. Thus, it would cause in the basic condition a support of the preform 1 and only through an active actuation, for example, through a cam control is effected, a release of the preform 1 by a displacement of the clamping element 57 toward the inside. The concrete technical realization can be carried out in accordance with the application. The use of the compression spring provides the advantage that the preform 1 cannot become lost when the external control force is not present.

It is found to be particularly useful if the clamping elements 57 act from the inside against the opening section 21. An outer region of the opening section 21 thereby remains available for a manipulation, for example, by pliers. Moreover, damage to the sensitive threaded portion of the opening section 21 is avoided. The thread serves for a later screwing on of closing caps of a filled container 2 and damage in this case would result in untightness.

The invention claimed is:

1. A device for blow molding containers, comprising: a heating section for heating preforms of a thermoplastic material; a blow device which has at least one blow station for deforming the preforms into the containers; and a support element for transporting the preform in an area of a head insertable into an opening section of the preform, has at least one positionable clamping element, wherein the clamping element is of rounded construction, at least two clamping elements being arranged at a distance relative to each other along an outer circumference of the head, wherein the clamping element is guided, in an area of the head, by a guide surface that is inclined downwardly in a vertical direction and by a limiting surface that is upwardly inclined in the vertical direction.

2. The device according to claim 1, wherein the support element is constructed for holding a preform having an opening section directed vertically upwardly.

3. The device according to claim 1, wherein the clamping element is positionable by a tensional force acting in a direction of a longitudinal axis of a support element.

4. The device according to claim 1, wherein the clamping element is positionable by a compressive force acting in the direction of a longitudinal axis of the support element.

5. The device according to claim 1, wherein the support element includes at least one spring that tensions the clamping element relative to the preform without the influence of an adjusting force.

6. The device according to claim 1, wherein the support element includes a spring that arranges the clamping element in a basic state in an untensioned position.

7. The device according to claim 1, wherein the clamping element is constructed of ceramic material.

8. The device according to claim 1, and further comprising a cam control arranged at least along a portion of a provided transport path for introducing an adjusting force into the support element.

9. The device according to claim 1, wherein a transport path of the support element extends at least along a portion of the heating section.

10. The device according to claim 1, wherein the clamping element is configured to transform an adjusting force acting in a direction of a longitudinal axis of the support element into a clamping force which is greater relative to the adjusting force and supports the preform.

11. The device according to claim 1, wherein the support element has a sleeve-shaped basic element and a positioning element guided in the basic element and supporting the head.

12. The device according to claim 1, wherein the clamping element is at least partially constructed as a hollow section.

13. The device according to claim 1, and further comprising a tensioning element of rigid construction.

14. The device according to claim 1, wherein at least three tensioning elements are arranged along a circumference of the head.

15. The device according to claim 14, wherein the tensioning element is positionable in a radial direction of the head by at least one guide surface arranged obliquely relative to the horizontal.

16. The device according to claim 1, and further comprising two guide elements located opposite each other, at least partially spaced from each other, and arranged obliquely relative to horizontal.

17. The device according to claim 16, wherein the two guide elements define guide surfaces that widen in a radial direction of the head outwardly in a V-shape.

18. The device according to claim 13, wherein the tensioning element is spherical.

19. The device according to claim 13, wherein the tensioning element is a roller.

20. The device according to claim 1, wherein the head has a receiving space for the clamping element that is constructed as a housing.

* * * * *

UNITED STATES PATENT AND TRADEMARK OFFICE
CERTIFICATE OF CORRECTION

PATENT NO. : 8,512,031 B2 Page 1 of 1
APPLICATION NO. : 12/991873
DATED : August 20, 2013
INVENTOR(S) : Linke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this
Fifteenth Day of September, 2015

Michelle K. Lee
*Director of the United States Patent and Trademark Office*